United States Patent [19]

Lin et al.

[11] Patent Number: 4,949,228

[45] Date of Patent: Aug. 14, 1990

[54] BICYCLE SIGNALLING DEVICE

[76] Inventors: Wu Fu Lin, No. 92, Tung Hsing Rd. Tali, Taichung Hsian; Ropin Wang, 5F, No. 1, Lane 85, FuHshin Nr. Rd., Taipei, both of Taiwan

[21] Appl. No.: 200,411

[22] Filed: May 31, 1988

[51] Int. Cl.⁵ ............................................. B52J 6/00
[52] U.S. Cl. ..................................... 362/72; 362/276; 362/800; 362/802; 340/432
[58] Field of Search ................. 315/72, 82, 149, 159; 200/61.02, 61.45, 61.52, 183, 184, 185, 85 A; 340/134; 362/72, 276, 800, 802

[56] References Cited

U.S. PATENT DOCUMENTS

| | | | |
|---|---|---|---|
| 1,780,312 | 7/1923 | Phelan | 200/183 |
| 4,204,191 | 5/1980 | Daniels | 362/72 |
| 4,281,365 | 7/1981 | Elving et al. | 362/276 |
| 4,290,047 | 9/1981 | Latta | 340/134 |
| 4,323,879 | 4/1982 | Kelley | 362/72 |
| 4,451,871 | 5/1984 | Kirkley et al. | 362/800 |
| 4,814,951 | 3/1989 | Larsen | 362/183 |

Primary Examiner—Ira S. Lazarus
Assistant Examiner—David G. Messer
Attorney, Agent, or Firm—Fleit, Jacobson, Cohn, Price, Holman & Stern

[57] ABSTRACT

A bicycle signalling device includes a housing, a reflective element for reflecting a light emitted thereto, a signalling lamp near the reflective element, a power source for supplying the lamp, a photosensitive element electrically connected between the signalling lamp and the power source for determining whether the lamp should be energized by the source in dependence upon an intensity of light, and a switch electrically connected between the power source and the signalling lamp for controlling an electrical conduction therebetween. Such device will enable the bicycle to be attention-calling at a dark night.

20 Claims, 4 Drawing Sheets

BICYCLE SIGNALLING DEVICE

BACKGROUND OF THE INVENTION

The present invention relates to a bicycle signalling device, and more particularly to a device having a reflective element.

It is normally seen that a yellow or red reflector is attached to the rear mudguard of a bicycle and reflects the light emitted by vehicles coming from the rear of the bicyclist to call the attention of drivers of the vehicles. Nevertheless, the reflector can be attention-calling only when there is a light emitted thereto and will have a reduced or even no affect at a rainy or foggy daylight or night. It is therefore tried by the Applicant to deal with this situation.

SUMMARY OF THE INVENTION

It is therefore an object of the present invention to provide a bicycle signalling device having an improved signalling effect.

It is further an object of the present invention to provide a bicycle signalling device the improved signalling effect of which exhibits only when required.

According to the present invention, a signalling device for a bicycle includes a housing, a reflective element for reflecting a light emitted thereto, a signalling lamp mounted near the reflective element, a power source for supplying the lamp, and a switch electrically connected between the power source and the signalling lamp for controlling an electrical conduction therebetween. Such device can be further provided with a photosensitive resistor and/or a flash-control circuit to diversify its effect.

The present invention may best be understood through the following description with reference to the accompanying drawings, in which:

DETAILED DESCRIPTION OF THE PREFERRED EMBODIMENT

Figure 1:
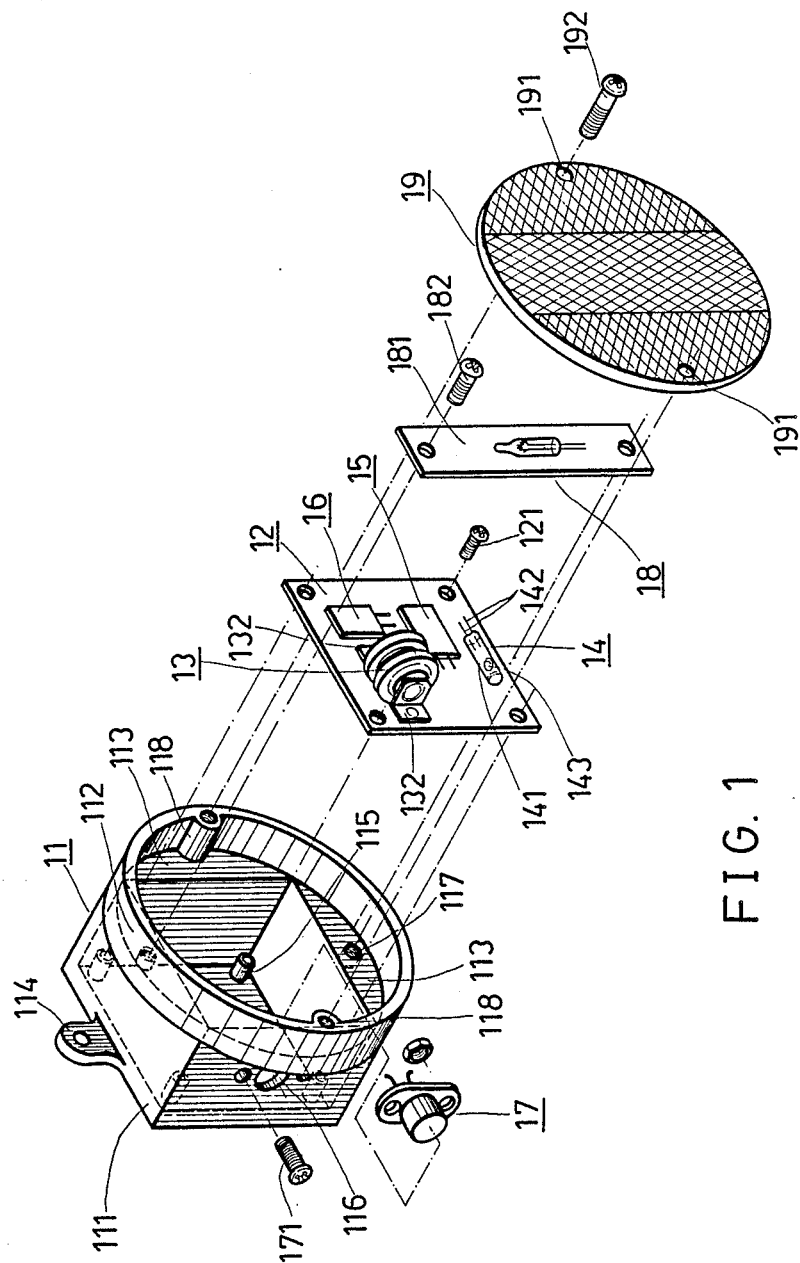
FIG. 1 is an exploded view of a first preferred embodiment of a bicycle signalling device according to the present invention.
Figure 2:
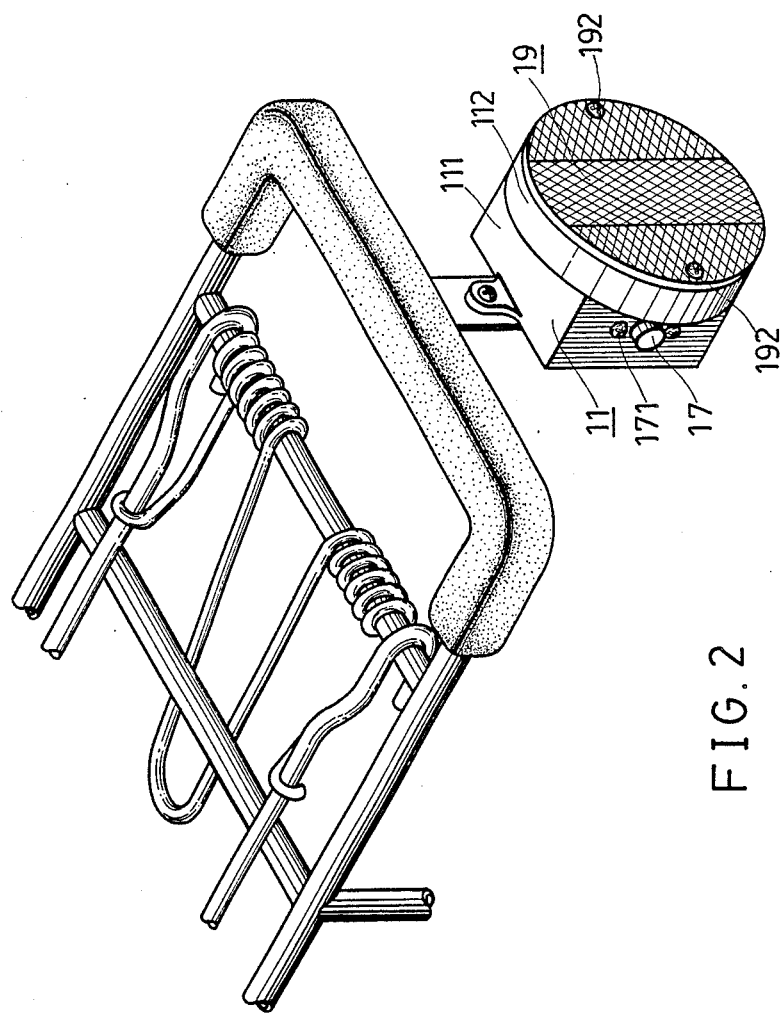
FIG. 2 is a perspective view of an assembled device in FIG. 1.
Figure 3:
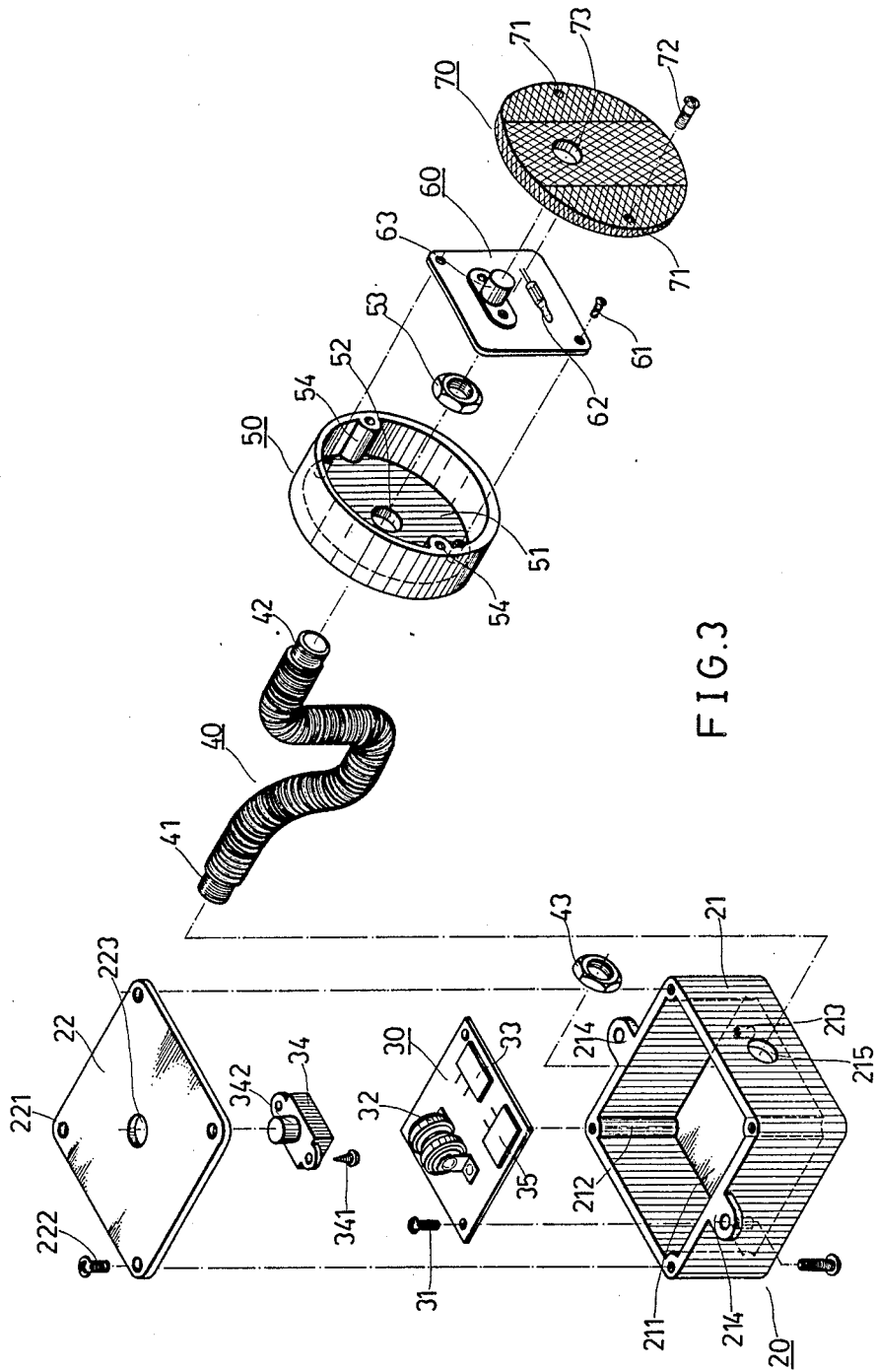
FIG. 3 is an exploded view of a second preferred embodiment of a bicycle signalling device according to the present invention.
Figure 4:
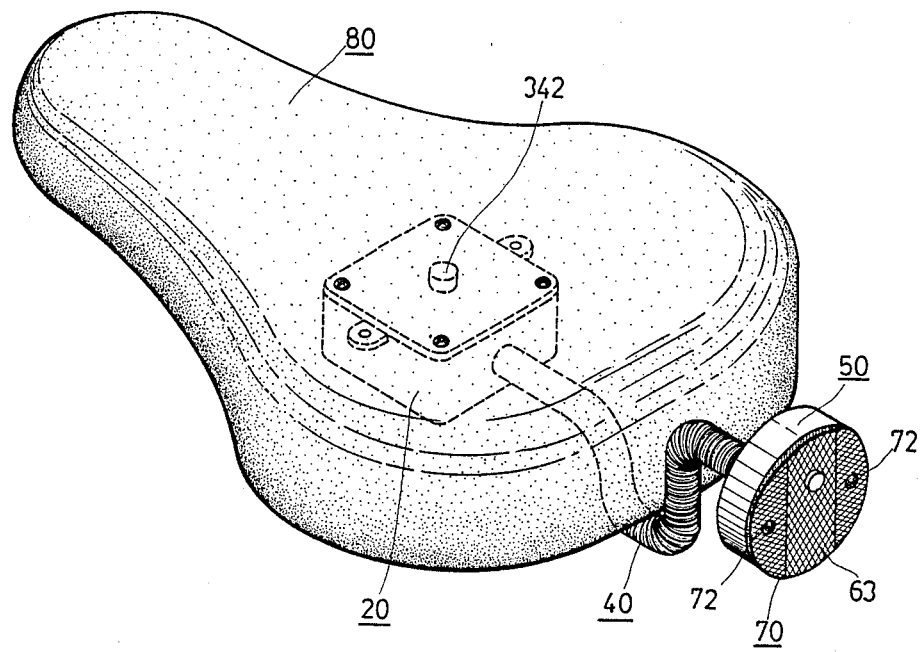
FIG. 4 is a perspective view showing an assembled device in FIG. 3 mounted with a seat of a bicycle.

Referring now to FIGS. 1 and 2, a first preferred embodiment of the present bicycle signalling device includes a housing 11, a circuit board 12 mounting thereon a set of mercury cells 13, a mercury switch 14, a delay circuit 15 and a flash control circuit 16, a photosensitive element 17, a light emitting diode (LED) 18, and a reflective element 19. Housing 11 includes a square portion 111 having a side hole 116, four threaded holes in corner posts 115 and an extension lug 114 for being attached to a bicycle, a circular portion 112 having two threaded holed opposite posts 118, and a shoulder portion 113 defined between portions 111 and 112 and having two opposite screwed holes 117. Circuit board 12 is fixed to posts 115 by four screws 121. Mercury cells 13 are clamped between a pair of L-shaped pieces 132. Mercury switch 14 includes a closed tube 141 protruding therefrom two conductive rods 142 having respective one ends thereof welded to board 12 and respective the other ends thereof extended in tube 141 having therein a slidable mercury ball 143. Delay circuit 15 electrically connected to switch 14 is a well-known prior art and deserves no further description except that it can have the function of allowing signalling LED 18 to continue to signal for a predetermined period of time after the switching off of switch 14. Flash control circuit 16 is an unstable oscillating circuit for enabling LED 18 to be flashing and is also a well-known technique.

Photosensitive element 17 is mounted by two screws 171 in housing 11 but protrudes from hole 116, and can be a photosensitive resistor. Signalling lamp (LED) 18 secured on a circuit board 181 is fixed on holes 117 by two screws 182. Reflective element 19 being circular and having two opposite holes 191 is secured on posts 118 by two screws 192.

The operation of such device is as follows:

Each time when mercury ball 143 contacts with and therefore conducts conducting rods 142, delay circuit 15 is actuated to allow the concerned circuit to operate for a predetermined period of time. Since a ridden bicycle will have a 3-dimensional vibration, mercury ball 143 will continously slide in tube 141 and thus the concerned circuit will continously be in operation. On a bright day, the light intensity sensed by photosensitive element 17 electrically connected to LED 18 will let element 17 have a high resistance and permit no current flowing to LED 18 which now does not emit light. If the bicycle incorporative thereon the present invention is ridden at night, photosensitive element 177 will have a low resistance to pass therethrough a current flowing to LED 18 which now will flash by the provision of flash control circuit 16.

As shown in FIGS. 3–5B, a second preferred embodiment of the present bicycle signalling device includes an electric box 20, a circuit board 30 mounting thereon a set of mercury cells 32, a flash-control circuit 32 and a delay circuit 35, a flexible tube 40, a housing 50, a second circuit board 60, and a reflective element 70. Box 21 includes a box body 21 having four threaded holed corner posts 212, a receiving room 211 having two diagonally opposite threaded holed posts 213, two opposite extension lugs 214 for being mounted under the seat 80 of a bicycle and a side hole 215, and a cover 22 having four corner holes 221 for being mounted on posts 212 by four screws 222 and a central hole 223.

Board 30 is secured in receiving room 211 and on posts 213 by two screws 31. A weight-operated switch 34 is secured to the bottom of cover 22 by two screws 341 and has an actuating rod 342 protruding from hole 223. Flexible tube 40 passes therethrough conducting wires (not shown) and has a screwed end 41 retained in hole 215 by a nut 43 and an opposite screwed end 42. Housing 50 having a circular receiving room 51 and a central hole 52 retaining therein screwed end 42 by a nut 53 has two opposite screwedly holed posts 54. Circuit board 60 fixed in receiving room 51 by two screws 61 holds thereon an LED 62 and a photosensitive resistor 63. Reflecting element 70 being circular and having two opposite holes 71 in order to be fixed on posts 54 by two screws 72 includes a through hole 73 enabling photoresistor 63 to protrude therefrom. After box 20 has been suitably mounted under seat 80, flexible tube 40 is properly wound so that reflecting element 70 is rearwardly oriented.

Figure 5A:
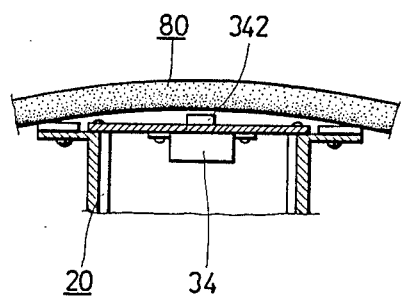
FIGS. 5A and 5B are schematic views showing the relation between the bicycle seat and the electric box of a device in FIG. 4.
Figure 5B:
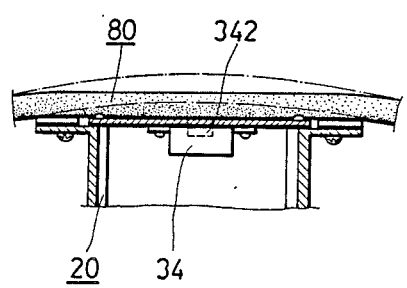

The operation of such device is as follows:

A free seat 80 is spaced from actuating rod 342 as shown in FIG. 5A. When seat 80 loads thereon a weight of a person, seat 80 will have a downward displacement to depress down actuating rod 342 (FIG. 5B) to energize the concerned circuit. If the bottom of the bicyclist temporarily leaves from seat 80 for, e.g. speeding the bicycle, delay circuit 35 will let LED 62 continue to flash for a predetermined period of time.

It should be noted that the above two preferred embodiments of the present invention can obviate the provision of the delay circuit and an ON-OFF switch can replace the mercury switch 14 and the weight-operated switch 34, in order that the present invention has a simplified configuration. Furthermore, a flashing LED can replace the provision of the combination of LED 18 and flash control circuit 16 or the combination of LED 62 and flash control circuit 33 to further simplify the structure thereof. It should now become apparent now and why the present invention can achieve its contemplated objects.

What I claim is:

1. A signalling device for a bicycle, comprising:
   a housing adapted to be mounted on a bicycle;
   a reflective element mounted on said housing for reflecting a light emitted thereto;
   a signalling lamp mounted near said reflective element;
   a power source for supplying said signalling lamp;
   a photosensitive element electrically connected between said signalling lamp and said power source for determining whether said lamp should be energized by said source in dependence upon an intensity of light; and
   a switch electrically connectable between said power source and said signalling lamp, disposable beneath a seat of the bicycle and electrically operable by body mass of a cyclist engaging the switch, for controlling an electrical conduction between said power source and signalling lamp.

2. A signalling device according to claim 1 wherein said photosensitive element is mounted in but protrudes from said housing, and said source is mounted in said housing.

3. A signalling device according to claim 2 wherein said element is a photosensitive resistor.

4. A signalling device according to claim 1, further comprising a flash control circuit for enabling said lamp to be flashing.

5. A signalling device according to claim 4, wherein said lamp is a light emitting diode (LED).

6. A signalling device according to claim 1 wherein said power source includes at least a mercury cell.

7. A signalling device according to claim 1 wherein said lamp is a flashing LED.

8. A signalling device according to claim 1, further comprising a delay circuit electrically connected between said source and said lamp in order that said lamp will continue to signal for a predetermined period of time after said switch has been turned off.

9. A signalling device according to claim 1 wherein said switch is an ON-OFF switch.

10. A signalling device according to claim 1 wherein said switch is a mercury switch which includes a closed tube protruding therefrom two conducting pieces and having therein a slidable mercury ball.

11. A signalling device according to claim 1, further comprising an electric box positioned under said seat and mounting therein said power source.

12. A signalling device according to claim 11, further comprising a flexible tube connected between said electric box and said housing.

13. A signalling device according to claim 11 wherein said electric box mounts said switch at its top.

14. A signalling device for a bicycle, comprising:
   means mountable on a bicycle, for reflecting incident light;
   means for illuminating said reflecting means;
   photosensitive means positioned in proximity to said reflecting electrically connected to said illuminating means and connectable to a source of electrical energy, for controlling illumination of said illuminating means with the electrical energy in dependence upon intensity of said incident light; and
   switching means disposable beneath of seat of a bicycle to be electrically operable by bodily mass of a cyclist engaging the seat, and electrically connected in a circuit including said illuminating means and photosensitive means, for controlling electrical conduction between the source of electrical energy and said illuminating means.

15. The signalling device of claim 14, further comprised of delay means electrically connected in said circuit, for temporarily continuing said electrical conduction to said illuminating means after said switching means reverts to an open circuit state.

16. The signalling device of claim 14, further comprised of a switch disposed upon the bicycle, having mercury wetted contacts connected serially within said circuit and intermittently interrupting said conduction in response to movement of the bicycle.

17. The signalling device of claim 15, further comprised of a switch disposed upon the bicycle, having mercury wetted contacts connected serially within said circuit and intermittently interrupting said conduction in response to movement of the bicycle.

18. A signalling device for a bicycle, comprising:
   means mountable on a bicycle, for reflecting incident light;
   a lamp mounted near said reflecting means;
   means electrically connected to said lamp, for controlling illumination of said lamp in dependence upon intensity of ambient light; and
   switching means disposable beneath a seat of a bicycle to be electrically operable by bodily mass of a cyclist engaging the seat, and electrically connected in a circuit including said lamp and said illumination controlling means, for enabling electrical conduction between said lamp and a source of electrical energy.

19. The signalling device of claim 18, further comprised of delay means electrically connected in said circuit, for temporarily continuing said electrical conduction after said switching means reverts to an open circuit state.

20. The signalling device of claim 18, further comprised of a switch disposed upon the bicycle, having mercury wetted contacts connected serially within said circuit and intermittently interrupting said conduction in response to movement of the bicycle.

* * * * *